United States Patent
Lo (10) Patent No.: US 9,766,880 B2
(45) Date of Patent: Sep. 19, 2017

(54) ELECTRONIC DEVICE AND METHOD FOR FIRMWARE UPDATING THEREOF

(71) Applicant: Silicon Motion, Inc., Jhubei (TW)

(72) Inventor: Chun-Yi Lo, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 309 days.

(21) Appl. No.: 14/711,513

(22) Filed: May 13, 2015

(65) Prior Publication Data

US 2016/0147527 A1    May 26, 2016

(30) Foreign Application Priority Data

Nov. 26, 2014   (TW) .............................. 103140938 A (51) Int. Cl.
   *G06F 9/44*        (2006.01)
   *G06F 9/445*       (2006.01)
(52) U.S. Cl.
   CPC .................................. *G06F 8/665* (2013.01)
(58) Field of Classification Search
   CPC ....................................................... G06F 9/44
   USPC ................................................ 717/168–173
   See application file for complete search history.

(56) References Cited

U.S. PATENT DOCUMENTS

| 5,983,330 A | * | 11/1999 | Miwa | .................. G06F 11/0757 |
| | | | | 710/262 |
| 2011/0026544 A1 | * | 2/2011 | Lombardo | ............ H04L 1/1812 |
| | | | | 370/475 |
| 2012/0117365 A1 | | 5/2012 | Navy et al. | |
| 2016/0210189 A1 | * | 7/2016 | Xhafa | ...................... H04B 7/26 |

FOREIGN PATENT DOCUMENTS

| TW | 494685 | 7/2002 |
| TW | 201102924 A | 7/2009 |
| TW | 201102924 A | 1/2011 |

OTHER PUBLICATIONS

TCP ("The Transmission Control Protocol"), Apr. 24, 2000.*
Office Action of corresponding TW application, published on Oct. 27, 2015.

* cited by examiner

*Primary Examiner* — Jae Jeon
(74) *Attorney, Agent, or Firm* — Wang Law Firm, Inc.

(57) ABSTRACT

A firmware update method applied to a host device and a peripheral device, wherein the peripheral device includes a memory device and a controller. The firmware update method includes: transmitting a first firmware data sector to a peripheral device from the host device, wherein the first firmware data sector has a first mode parameter; and retransmitting the first firmware data sector having a second mode parameter to the peripheral device from the host device after an interruption event has occurred on the memory device during the transmission.

11 Claims, 9 Drawing Sheets

ELECTRONIC DEVICE AND METHOD FOR FIRMWARE UPDATING THEREOF

CROSS REFERENCE TO RELATED APPLICATIONS

This application claims priority of Taiwan Patent Application No. 103140938, filed on Nov. 26, 2014, the entirety of which is incorporated by reference herein.

BACKGROUND OF THE INVENTION

Field of the Invention

The present invention is related to a firmware update method applied to an electronic device; in particular to firmware update method which can be interrupted.

Description of the Related Art

Driven by user requirements, more and more electronic devices, especially handheld or portable electronic devices such as smartphones, personal digital assistants (PDAs), and tablet PCs or Ultra Mobile PCs (UMPCs), comprise various peripherals such as a video camera, for improving user convenience.

Generally, the firmware data of a peripheral device is stored in a non-volatile storage unit, such as Flash ROM, and is released with the hardware device. However, when the peripheral device is released, the manufacturer or developer will usually provide firmware with each new version, for fixing the bugs of the original version or providing new features. In some devices, the updating process of the firmware cannot be interrupted. The firmware will fail or the updating process needs to be restarted when the updating process is interrupted.

BRIEF SUMMARY OF THE INVENTION

A detailed description is given in the following embodiments with reference to the accompanying drawings.

An exemplary embodiment provides a firmware update method applied to a host device and a peripheral device, wherein the peripheral device includes a memory device and a controller. The firmware update method includes: transmitting a first firmware data sector to a peripheral device from the host device, wherein the first firmware data sector has a first mode parameter; and retransmitting the first firmware data sector having a second mode parameter to the peripheral device from the host device after an interruption event has occurred on the memory device during the transmission.

Another exemplary embodiment provides a firmware update method applied to a host device and a peripheral device, wherein the peripheral device includes a memory device and a controller. The firmware update method includes: sequentially transmitting a plurality of firmware data sectors to the peripheral device from the host device, wherein the number N of the firmware data sectors constitute firmware, and each of the firmware data sectors includes a first mode parameter; and retransmitting the firmware data sectors from 1 to N to the peripheral device after the transmission of the firmware data sectors of the firmware is interrupted at the Xth firmware data sector, wherein N is greater than X, each of the first to (X−1)th firmware data sectors transmitted in the retransmission includes a second mode parameter, and each of the Xth to Nth firmware data sectors transmitted in the retransmission includes the first mode parameter.

Another exemplary embodiment provides an electronic device capable of updating firmware. The electronic device capable of updating firmware includes a memory device and a controller. The a controller is configured to receive a plurality of firmware data sectors from a host device in a sequence, read at least one parameter sector of the received firmware data sector, store a program code sector of the received firmware data sector into the memory device when the parameter sector of the received firmware data sector includes a first mode parameter, and ignore the program code sector of the received firmware data sector when the parameter sector of the received firmware data sector includes a second mode parameter, wherein the firmware data sectors constitute firmware.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
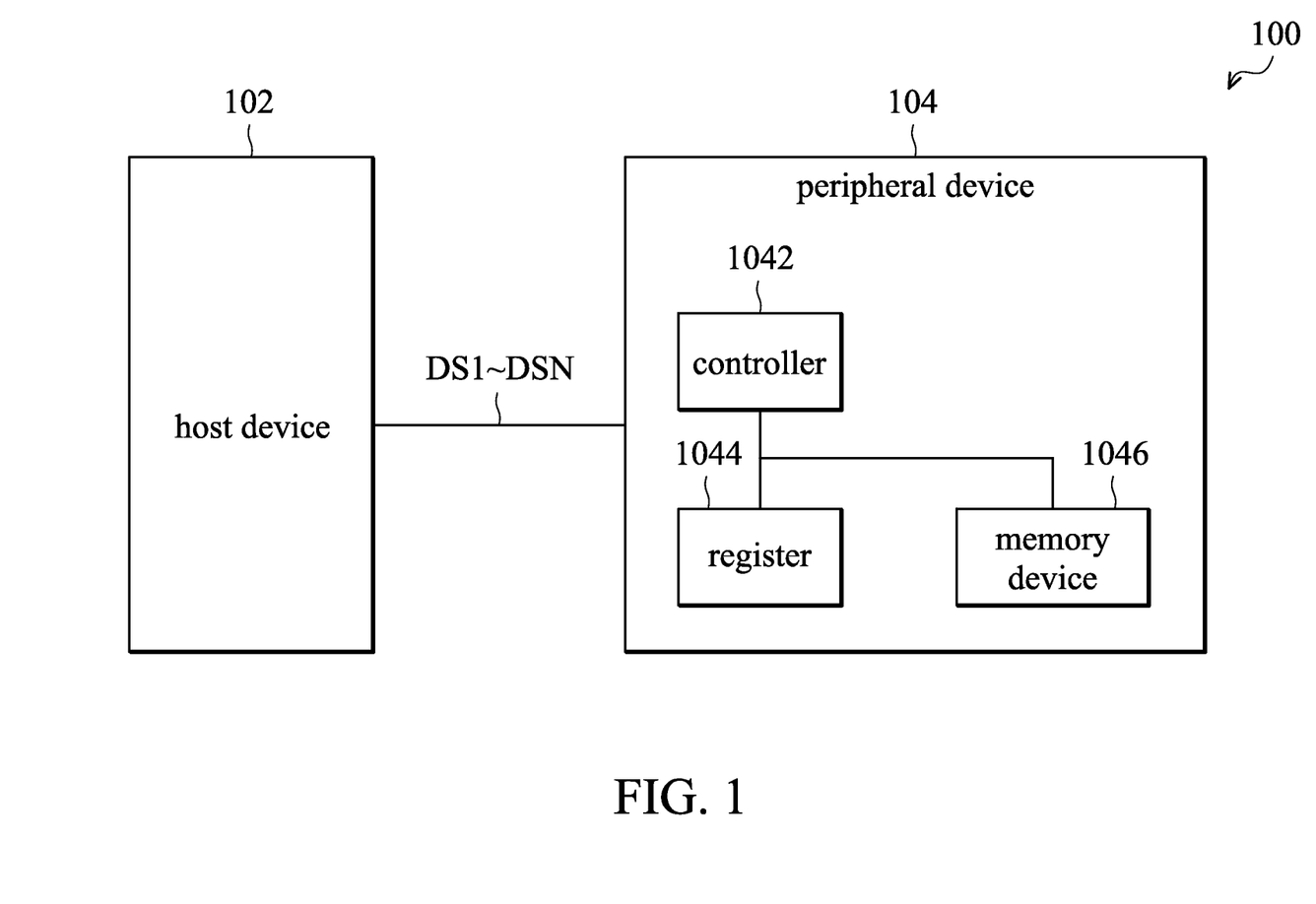
FIG. 1 is a schematic diagram illustrating an embodiment of an electronic device capable of updating firmware of an exemplary embodiment.

The electronic device 100 includes a host device 102 and a peripheral device 104. The host device 102 can be implemented on various digital cameras or computer system configurations, such as smartphones, tablet computers, personal digital assistants and similar devices, but it is not limited thereto. The peripheral device 104 can be embedded in the host device 102 or connected to the host device 102. Moreover, the peripheral device 104 can be a sensing device, an output/input device or a data storage device, but it is not limited thereto. In one embodiment, the peripheral device 104 can be a storage device, wherein the storage device follows the rule of the "Download Micro Code" of the SATA SPEC to update firmware, such that the updating process cannot be interrupted, such as power-off" during the transmission, but it is not limited thereto. In other embodiments, the firmware has to be written into the peripheral device 104 in a sequence in the updating process of the peripheral device 104.

The host device 102 downloads the firmware of the peripheral device 104 from the Internet or other devices, and transmits the downloaded firmware to the peripheral device 104 to update the peripheral device 104. It should be noted that the firmware is constituted by a plurality of program code sectors of a plurality of firmware data sectors DS1~DSN, and the host device 102 is configured to transmit the firmware data sectors DS1~DSN to the peripheral device 104 to update the peripheral device 104 in a sequence. Moreover, the host device 102 replaces a first mode parameter of each of the first to X–1th firmware data sectors with the second mode parameter when an interruption event occurs during transmission of the Xth firmware data sector DSX, wherein X is less than N, and X and N are integer greater than 1. Namely, the host device 102 is configured to determine whether an interruption event has occurred, and adjust the firmware data sectors DS1~DSN to rewrite the mode parameter of the firmware data sectors which have been transmitted to the peripheral device 104 as the second mode parameter when the interruption event has occurred, wherein the interruption event includes the peripheral device 104 losing power, the peripheral device 104 being disconnected from the host device 102 and/or the Internet being disconnected, but it is not limited thereto. Moreover, the host device 102 is further configured to retransmit the adjusted firmware data sectors DS1~DSN to the peripheral device 104 after the interruption event. For example, the host device 102 may detect whether the interruption event has recovered and whether the peripheral device 104 is reconnected to the host device 102 after the interruption event. When the interruption event is excluded and the peripheral device 104 is reconnected to the host device 102, the host device 102 retransmits the adjusted firmware data sectors DS1~DSN with the rewritten firmware data sectors to the peripheral device 104 again, but it is not limited thereto. The host device 102 may also retransmit the adjusted firmware data sectors DS1~DSN to the peripheral device 104 after the interruption event according to a continue command.

The peripheral device 104 further includes a controller 1042, a register 1044 and a memory device 1046. The controller 1042 receives the firmware data sectors DS1~DSN which are arranged to constitute firmware from the host device 102 in a sequence, and temporarily store the firmware data sectors DS1~DSN into the register 1044. Moreover, the controller 1042 reads the parameter sectors of the firmware data sectors DS1~DSN stored in the register 1044, and stores the program code sectors of the firmware data sectors having the parameter sectors with the first mode parameter into the memory device 1046, and ignores the program code sectors of the firmware data sectors which have the parameter sectors with the second mode parameter. The register 1044 is arranged to temporarily store the firmware data sectors DS1~DSN received from the host device 102. The memory device 1046 is a non-volatile memory arranged to store the firmware for the controller 1042.

Figure 2:
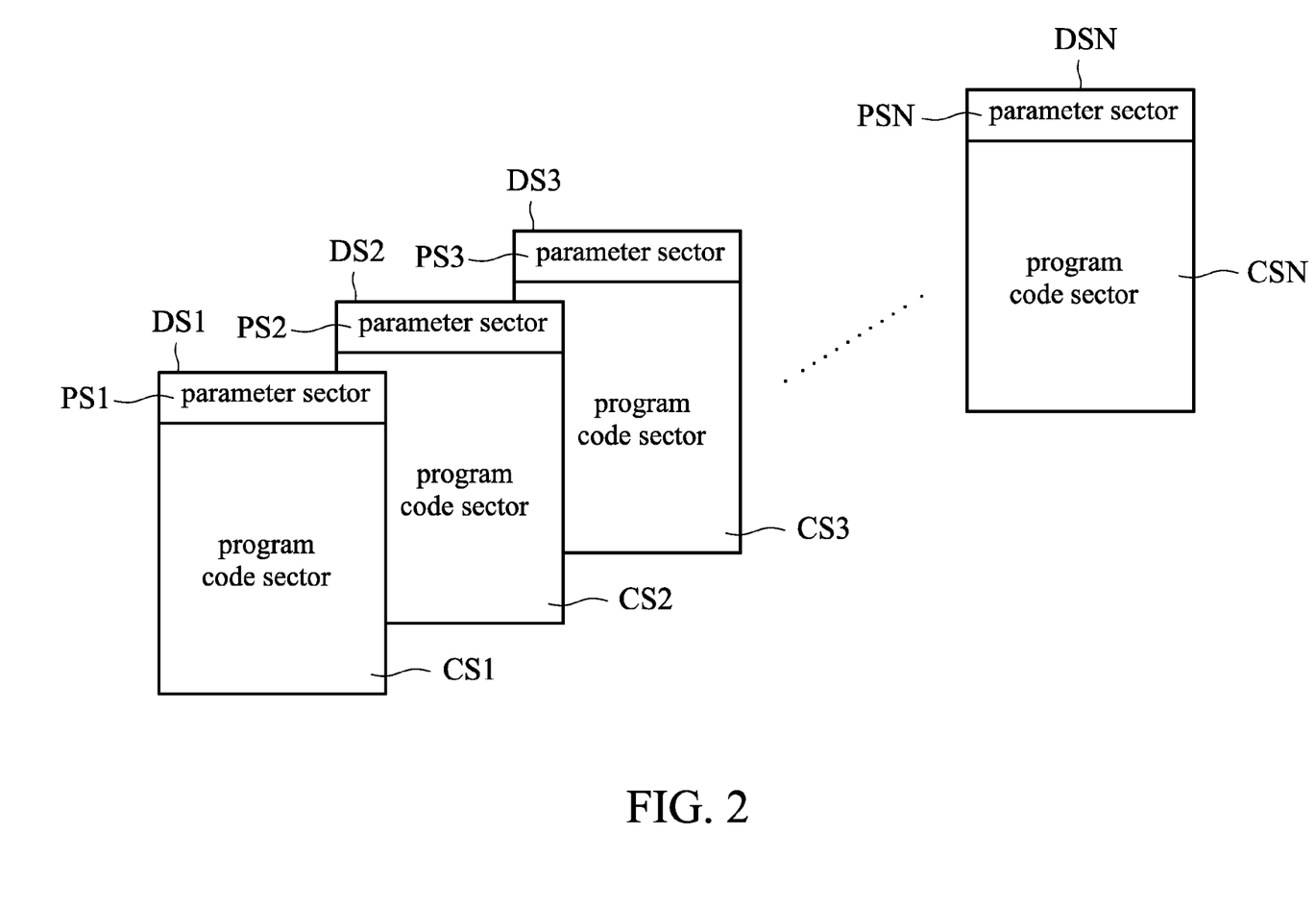
FIG. 2 is a schematic diagram illustrating an embodiment of a firmware data sector of an exemplary embodiment.
Figure 3:
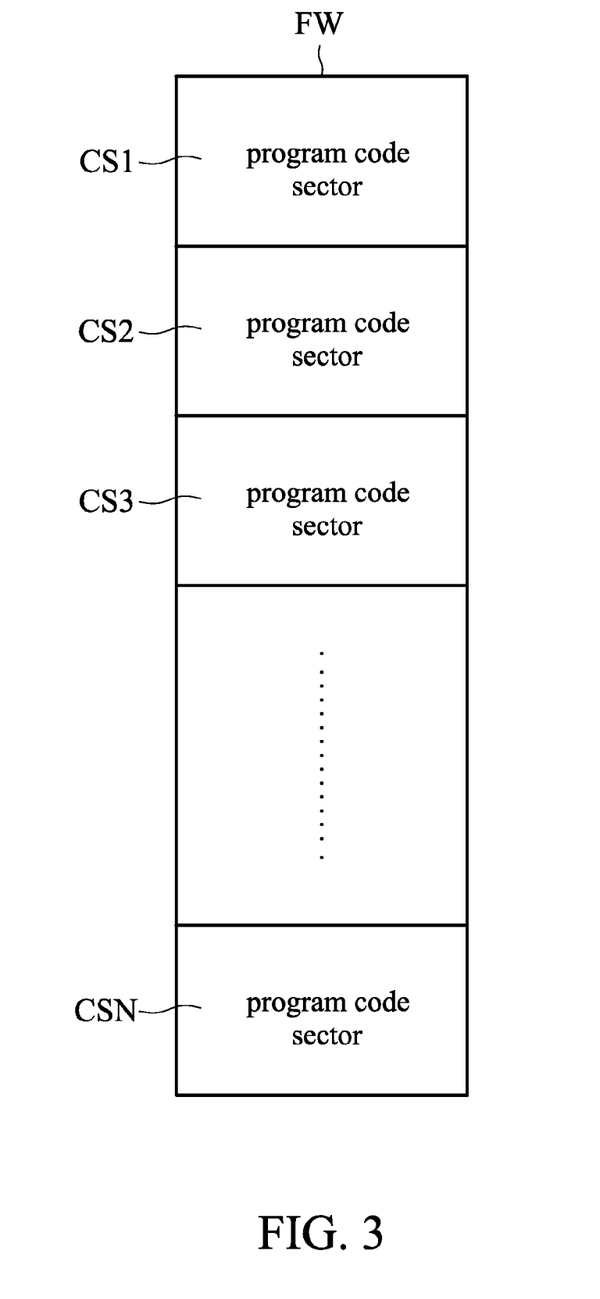
FIG. 3 is a schematic diagram illustrating an embodiment of the firmware of an exemplary embodiment.

FIG. 2 is a schematic diagram illustrating an embodiment of a firmware data sector of an exemplary embodiment, wherein each of the firmware data sectors DS1~DSN includes a program code sector CS1~CSN and a parameter sector PS1~PSN. In this embodiment, the parameter sectors PS1~PSN are implemented in the starting position of the firmware data sectors DS1~DSN. For example, each of the firmware data sectors DS1~DSN is 512 Bytes, wherein the parameter sectors PS1~PSN is implemented in the first 16 Bytes of the 512 Bytes of the firmware data sectors DS1~DSN, but it is not limited thereto. In other embodiments, the parameter sectors PS1~PSN may be implemented in the end of the firmware data sectors DS1~DSN or other parts of the firmware data sectors DS1~DSN. It should be noted that the program code sectors PS1~PSN of the firmware data sectors DS1~DSN constitutes firmware FW arranged to be provided to the controller 1042, as FIG. 3 shown. The parameter sectors PS1~PSN are arranged to record the information of the firmware data sectors DS1~DSN. In one embodiment, each of the parameter sectors PS1~PSN includes a mode parameter, the mode parameter may be the first mode parameter or the second mode parameter, wherein the first mode parameter represents that the corresponding program code sector has not been written into the memory device 1046, and the second mode parameter represents that the corresponding program code sector has been written into the memory device 1046, but it is not limited thereto. In other embodiments, each of the parameter sectors PS1~PSN further includes a firmware version parameter, an index, a controller version parameter, a data amount parameter and a verification parameter, etc., it is not limited thereto.

When each of the parameter sectors PS1~PSN includes the firmware version parameter, the index, the controller version parameter, the data amount parameter and the verification parameter, the controller 1042 is configured to read the parameter sectors of the firmware data sectors DS1~DSN to obtain the parameters. More specifically, the index is arranged to be provided to the controller 1042 to determine what number the received firmware data sector in the sequence is, such that the controller 1042 can store the program code sector of the received firmware data sector into the corresponding address of the memory device 1046 according to the number of the received firmware data sector in the sequence. Therefore, the program code sectors constitute the firmware FW in the sequence, as shown in FIG. 3. It should be noted that, in this embodiment, the peripheral device 104 can still store the received firmware data sectors DS1~DSN in the sequence according to the indexes of the firmware data sectors DS1~DSN when the network is not stable or the firmware data sectors DS1~DSN are not transmitting in the sequence. The data amount parameters are arranged to be provided to the controller 1042 to determine the data length of the firmware FW, wherein the controller 1042 can determine whether all of the firmware data sectors DS1~DSN are received according to the data amount parameters and the indexes. The controller version parameters are arranged to be provided to the controller 1042 to check whether the version of the controller 1042 is correct. Namely, the controller 1042 can check whether the version of the firmware data sectors DS1~DSN meets the version of the controller 1042 according to the controller version parameter. The verification parameters are arranged to be provided to the controller 1042 to verify the program code sectors CS1~CSN of the firmware data sectors DS1~DSN. For example, the verification parameters can be checksums, and the controller 1042 may check whether the program code sectors CS1~CSN are correct by the checksum algorism and the checksums. The firmware version parameter is arranged to be provided to the controller 1042 to check whether the version of the firmware FW is correct.

In another embodiment, the mode parameter can be the first mode parameter, the second mode parameter, or a third mode parameter, wherein the first mode parameter represents that the corresponding program code sector has not been written into the memory device 1046, the second mode parameter represents the corresponding program code sector has been written into the memory device 1046, and the third mode parameter is arranged to enable the controller 1042 to determine whether the corresponding program code sector has been received and written by checking the parameters of the peripheral device 104, but it is not limited thereto. It should be noted that, in this embodiment, the controller 1042 is further configured to determine whether the received program code sector of the firmware data sector needs to be stored in the memory device 1046 according to the third mode parameter of the firmware data sector. For example, the controller 1042 determines whether the corresponding address of the memory device 1046 has the program code sector of the received firmware data sector according to the index of the parameter sector of the received firmware data sector after receiving a firmware data sector having the third mode parameter. When the corresponding address of the memory device 1046 has the program code sector of the received firmware data sector, the controller 1042 ignores (does not stores) the program code sector of the received firmware data sector. When the corresponding address of the memory device 1046 does not have the program code sector of the received firmware data sector, the controller 1042 stores the program code sector of the received firmware data sector, but it is not limited thereto.

Figure 4:
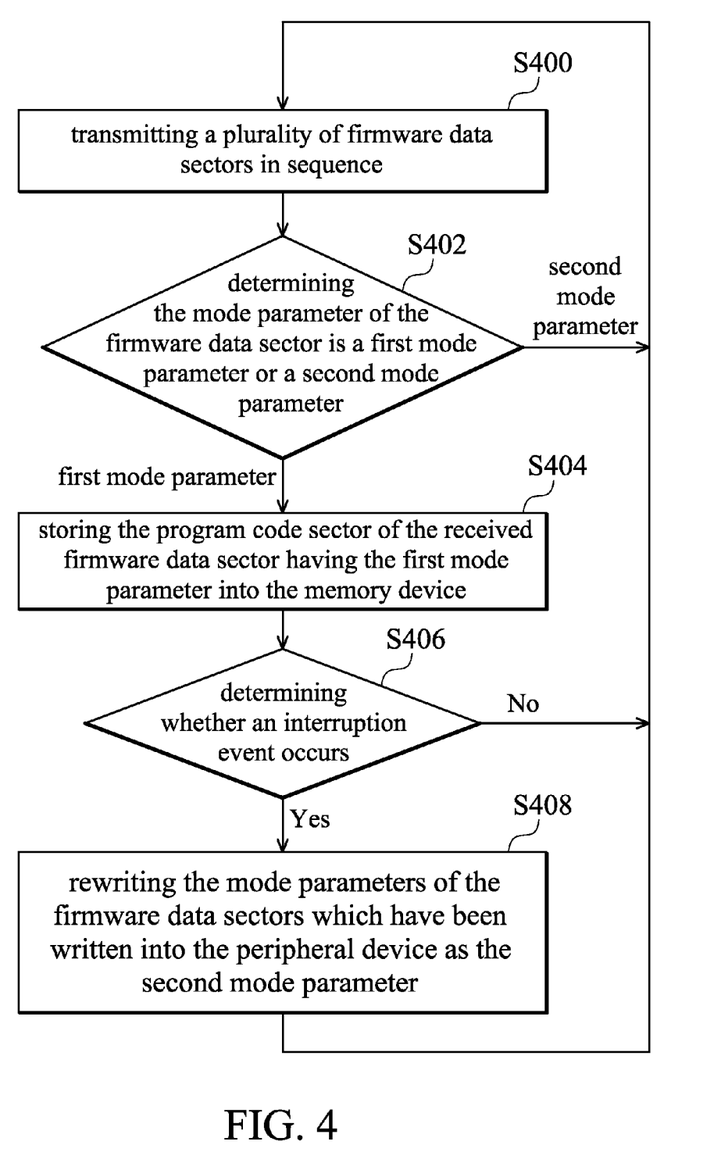
FIG. 4 is a flowchart of a firmware update method according to an embodiment of the present disclosure.

FIG. 4 is a flowchart of a firmware update method according to an embodiment of the present disclosure. The firmware update method is applied to the electronic device 100 of FIG. 1 and arranged to update the firmware of the peripheral device 104 in response to a command. The process starts at step S400.

In step S400, the host device 102 transmits a plurality of firmware data sectors DS1~DSN to the peripheral device 104 in sequence, wherein the number N of firmware data sectors DS1~DSN constitutes firmware FW as shown in FIG. 3. For example, the host device 102 transmits the firmware data sectors DS1~DSN to the peripheral device 104 in the sequence of the first firmware data sector DS1, the second firmware data sector DS2, the third firmware data sector DS3 . . . the Nth firmware data sector DSN, wherein the firmware data sectors DS1~DSN in the sequence constitute the firmware FW. It should be noted that, in step S400, the process goes to step S402 while the host device 102 finishes transmitting the firmware data sector. Moreover, in the initial transmission (the firmware data sectors DS1~DSN are transmitted to the peripheral device 104 for the first time), each of the firmware data sectors DS1~DSN transmitted by the host device to the peripheral device 104 102 has a mode parameter with a first mode parameter, wherein each of the first mode parameters represents that the corresponding firmware data sector has not been written into the memory device 1046 of the peripheral device 104, and the firmware data sector has the specific first parameter corresponds to the specific first parameter. However, the mode parameters of firmware data sectors DS1~DSN can be selectively rewritten (replaced) by the host device 102. For example, in step S400, the host device 102 transmits the first firmware data sector DS1 to the peripheral device 104. In the initial transmission, the mode parameter of first firmware data sector DS1 transmitted to the peripheral device 104 from the host device 102 is the first mode parameter, such that the first firmware data sector DS1 has not been written into the memory device 1046 of the peripheral device 104. When the first firmware data sector DS1 has been written into the memory device 1046 of the peripheral device 104, the host device 102 is configured to rewrite the mode parameter of the first firmware data sector DS1 as a second mode parameter and transmit the rewritten first firmware data sector DS1 with the second mode parameter to the peripheral device 104. It should be noted that the host device 102 may detect whether the interruption event has recovered and whether the peripheral device 104 is reconnected to the host device 102 after the interruption event. When the interruption event is excluded and the peripheral device 104 is reconnected to the host device 102, the host device 102 retransmits the adjusted firmware data sectors DS1~DSN with the rewritten firmware data sectors to the peripheral device 104 again, but it is not limited thereto. The host device 102 may also retransmit the adjusted firmware data sectors DS1~DSN to the peripheral device 104 after the interruption event according to a continue command.

Next, in step S402, the peripheral device 104 temporarily stores the received firmware data sector into the register 1044, and reads the parameter sector of the firmware data sector stored in the register 1044 by the controller 1042 to determine the mode parameter of the firmware data sector is a first mode parameter or a second mode parameter. When the mode parameter of the received firmware data sector is the first mode parameter, the process goes to S404. When the mode parameter of the received firmware data sector is the second mode parameter, the process returns to step S400, the host device 102 continues to transmit the next firmware data sector to the peripheral device 104. Namely, when the mode parameter of the received firmware data sector is the second mode parameter, the controller 1042 ignores the firmware data sector having the second mode parameter and does not store the program code sector having the second mode parameter into the memory device 1046. For example, the peripheral device 104 temporarily stores the received first firmware data sector DS1 in the register 1044 and reads the parameter sector PS1 of the first firmware data sector DS1 stored in the register 1044 to determine the mode parameter of the firmware data sector DS1 is a first mode parameter or a second mode parameter. When the mode parameter of the received firmware data sector DS1 is the first mode parameter, the process goes to S404. When the mode parameter of the received firmware data sector DS1 is the second mode parameter, the process returns to step S400, the host device 102 continues to transmit the next firmware data sector DS2 to the peripheral device 104. Namely, when the mode parameter of the received firmware data sector DS1 is the second mode parameter, the controller 1042 ignores the firmware data sector DS1 having the second mode parameter and does not store the program code sector CS1 of the first firmware data sector DS1 having the second mode parameter into the memory device 1046.

In step S404, the controller 1042 of the peripheral device 104 stores the program code sector of the received firmware data sector which has the first mode parameter into the memory device 1046 in the sequence for combining the program code sectors CS1~CSN of the firmware data sectors DS1~DSN in the sequence to constitute the firmware FW in the sequence. For example, the controller 1042 of the peripheral device 104 stores the program code sector CS1 of the received firmware data sector DS1 which has the first mode parameter into a first address of the memory device 1046, wherein the first address is the initial address of the firmware FW. Moreover, the controller 1042 of the peripheral device 104 stores the program code sector CS2 of the second firmware data sector DS2 which has the first mode parameter into a second address of the memory device 1046, wherein the second address in next to the first address of the program code sector CS1, but it is not limited thereto.

In step S406, the device 102 determines whether an interruption event has occurred, wherein the interruption event includes the peripheral device 104 losing power, the peripheral device 104 becoming disconnected from the host device 102 and/or the Internet being disconnected, but it is not limited thereto. The host device 102 determines whether the interruption event has occurred by the connection of the peripheral device 104 or other methods, but it is not limited thereto. When the interruption event occurs, the process goes to step S408, otherwise, the process returns to step S400, the host device 102 continues to transmit the next firmware data sector to the peripheral device 104.

In step S408, the host device 102 rewrites the mode parameters of the firmware data sectors which have been written into the peripheral device 104 as the second mode parameter. For example, when the transmission of the firmware data sectors DS1~DSN of the firmware FW is interrupted at the Xth firmware data sector DSM, the host device 102 replaces the first mode parameter of the mode parameters of the first to (X−1)th firmware data sectors with the second mode parameter, wherein X is less than N, and X and N are positive integers. It should be noted that the host device 102 detects whether the interruption event has recovered and whether the peripheral device 104 is reconnected to the host device 102 or whether a continue command is received when step S408 is done. When the interruption event is excluded from the peripheral device 104 (or the host device 102) and the peripheral device 104 is reconnected to the host 120, the process returns to step S400. In step S400, the host device 102 retransmits the firmware data sectors DS1~DSN to the peripheral device 104. Namely, after step S408 is done, the host device 102 retransmits the firmware data sectors DS1~DSN from the first firmware data sector DS1 in the sequence to the peripheral device 104, wherein each of the first to (X−1)th firmware data sectors DS1~DS(X−1) transmitted in the retransmission has the second mode parameter, and each of the Xth to Nth firmware data sectors DSX~DSN transmitted in the retransmission has the first mode parameter.

Figure 5A:
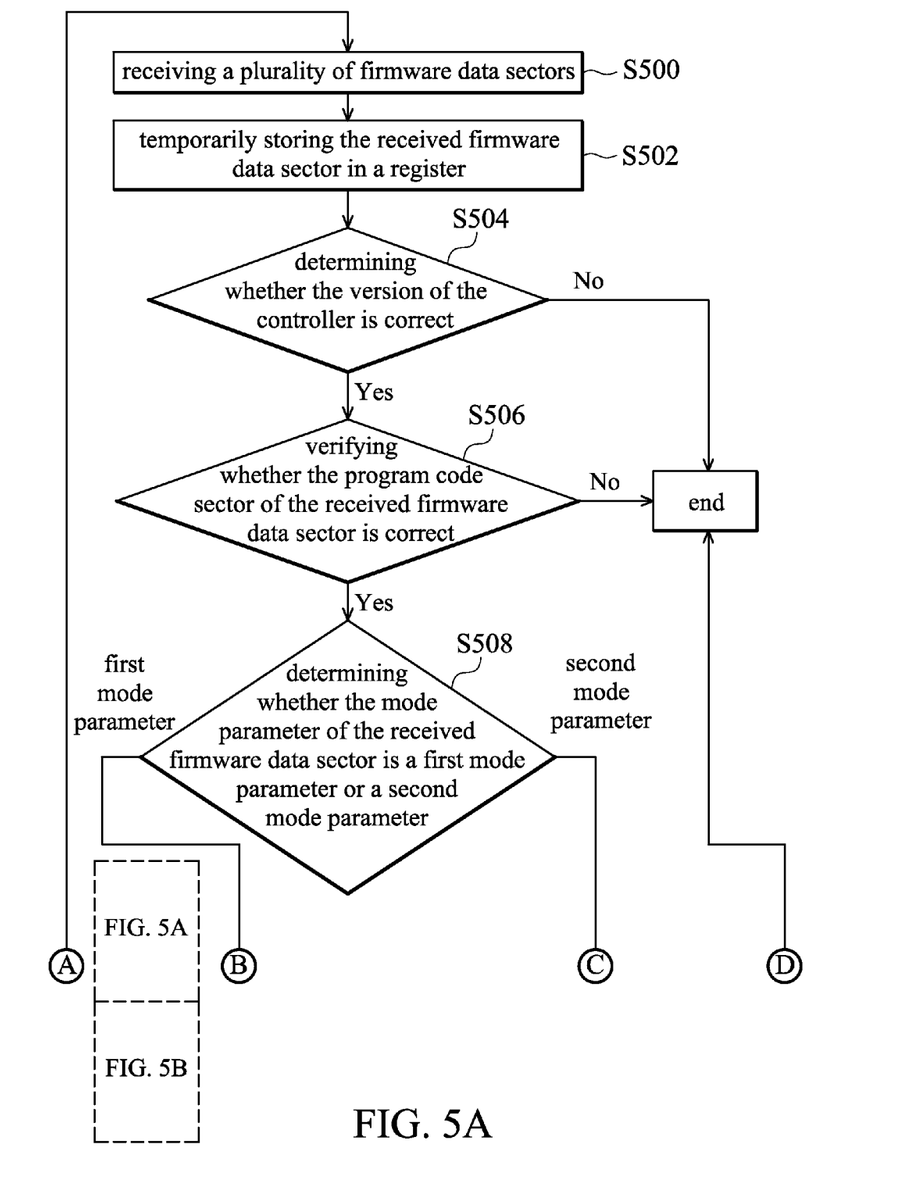
FIG. 5A~5B are flowcharts of a firmware update method according to another embodiment of the present disclosure.
Figure 5B:
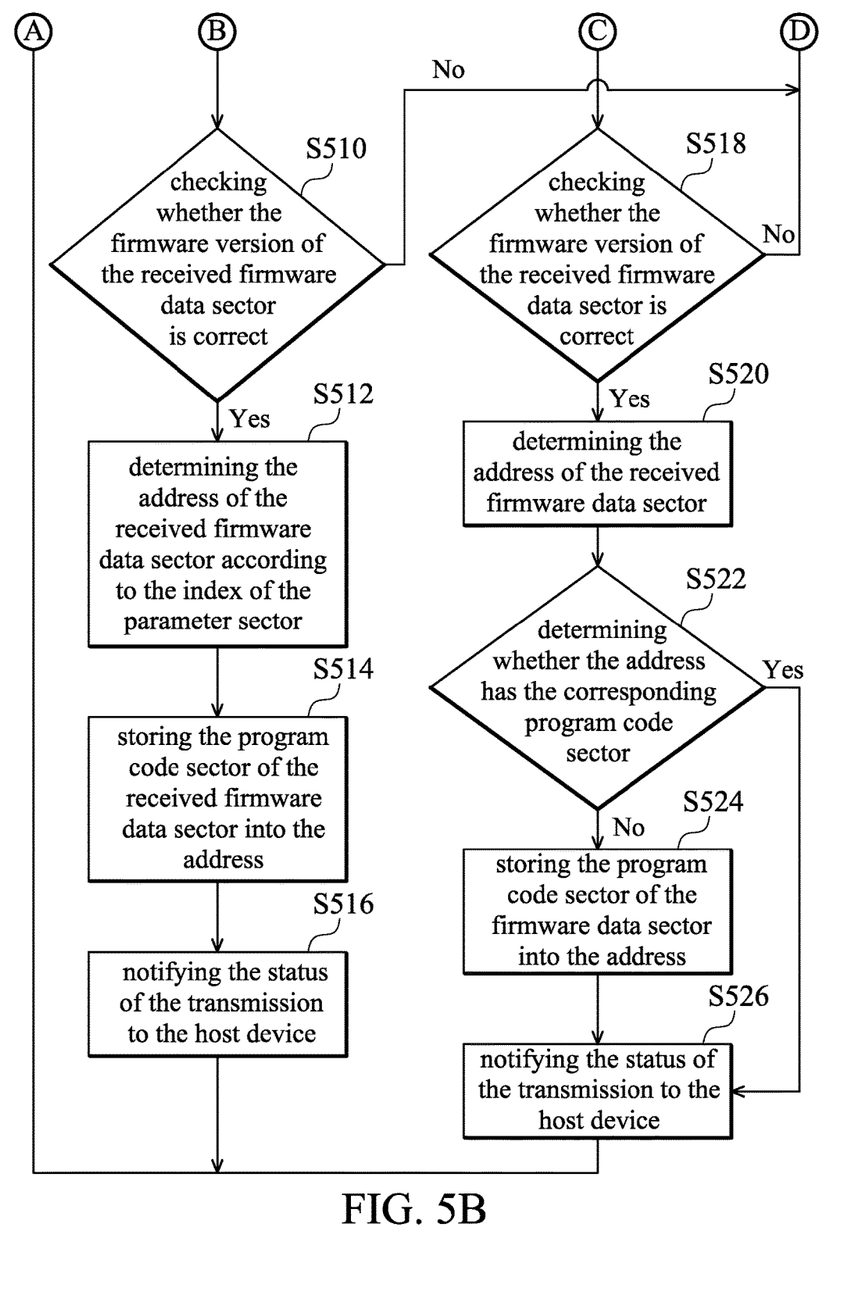

FIG. 5A~5B are flowcharts of a firmware update method according to another embodiment of the present disclosure. The firmware update method is applied to the electronic device 100 of FIG. 1 and arranged to update the firmware of the peripheral device 104 in response to a command. The process starts at step S500. It should be noted that, in this embodiment, each of the parameter sectors PS1~PSN further includes a firmware version parameter, an index, a controller version parameter, a data amount parameter and a verification parameter, etc., but it is not limited thereto.

In step S500, the peripheral device 104 receives a plurality of firmware data sectors DS1~DSN from the host device 102 in a sequence, wherein the number N of firmware data sectors DS1~DSN constitutes firmware FW, as shown in FIG. 3. For example, the peripheral device 104 receives the firmware data sectors DS1~DSN from the host device 102 in the sequence of the first firmware data sector DS1, the second firmware data sector DS2, the third firmware data sector DS3, and so on. It should be noted that, in step S500, the process goes to step S502 every time the peripheral device 104 receives a firmware data sector.

Next, in step S502, the peripheral device 104 temporarily stores the received firmware data sector in a register 1044.

Next, in step S504, the controller 1042 reads the controller version parameter of the parameter sector of the firmware data sector stored in a register 1044 to determine whether the version of the controller 1042 is correct according to the controller version parameter of the parameter sector. Namely, the controller 1042 may determine whether the version of the controller 1042 meets the version of the firmware data sector according to the controller version parameter. When the version of the controller is correct, the process goes to step S506, otherwise, the process ends at step S504, the controller 1042 step updating the peripheral device 104.

In step S506, the controller 1042 reads the verification parameter of the parameter sector of the firmware data sector stored in a register 1044 to verify whether the program code sector of the received firmware data sector is correct. For example, the verification parameters can be checksums, and the controller 1042 may check whether the program code sectors CS1~CSN are correct by the checksum algorism and the checksums. When the program code sector is correct, the process goes to step S508, otherwise, the process ends at step S506, the controller 1042 stops updating the peripheral device 104.

In step S508, the controller 1042 reads the mode parameter of the parameter sector of the received firmware data sector stored in a register 1044 to determine whether the mode parameter of the received firmware data sector is a first mode parameter or a second mode parameter. When the mode parameter of the received firmware data sector is the first mode parameter, the process goes to step S510. When the mode parameter of the received firmware data sector is the second mode parameter, the process goes to step S518.

In step S510, the controller 1042 reads the firmware version parameter of the parameter sector of the received firmware data sector stored in a register 1044 to check whether the firmware version of the received firmware data sector is correct. When the firmware version is correct, the process goes to step S512, otherwise, the process ends at step S510, and the controller 1042 stops updating the peripheral device 104.

In step S512, the controller 1042 reads the index and the data amount parameter of the parameter sector of the received firmware data sector stored in a register 1044, wherein the controller 1042 obtains the length of the firmware FW according to the data amount parameter, and determine the address of the received firmware data sector according to the index of the parameter sector. For example, the controller 1042 may obtain the received firmware data sector's number in the sequence according to the index and obtain the address of the memory device 1046 of the received firmware data sector by calculating the number in the sequence and the length of the firmware data sector. Therefore, the controller 1042 can store the program code sectors into the corresponding address in the sequence to constitute the firmware FW in the memory device 1046 as shown in FIG. 3. It should be noted that the controller 1042 can also determine whether the received firmware data sector is the last firmware data sector CSN according to the data amount parameter and the index.

In step S514, the controller 1042 stores the program code sector of the received firmware data sector into the address obtained in step S512 of the memory device 1046.

Next, in step S516, the controller 1042 notifies the status of the transmission to the host device 102, but it is not limited thereto. In other embodiment, step S516 can be removed.

In step S518, the controller 1042 reads the firmware version parameter of the parameter sector of the received firmware data sector stored in a register 1044 to check whether the firmware version of the received firmware data sector is correct according to the firmware version parameter of the parameter sector. When the firmware version is correct, the process goes to step S520, otherwise, the process ends at step S518, the controller 1042 stops updating the peripheral device 104.

In step S520, the controller 1042 reads the index and the data amount parameter of the parameter sector of the received firmware data sector stored in a register 1044 to determine the address of the received firmware data sector, wherein the controller 1042 obtains the length of the firmware FW according to the data amount parameter, and determine the address of the received firmware data sector according to the index of the parameter sector.

In step S522, the controller 1042 determines whether the address obtained in step S520 has the corresponding program code sector. When the address obtained in step S520 has the corresponding program code sector, the process goes to step S526. Namely, in step S522, the controller 1042 determines whether the address obtained in step S520 has effective data to determine whether the program code sector of the firmware data sector having the second mode parameter has been written into the memory device 1046, and ignore the firmware data sector and drop the program code sector of the firmware data sector after determining that the program code sector has been written into the memory device 1046.

In step S524, the controller 1042 stores the program code sector of the firmware data sector into the address obtained in step S520 of the memory device 1046.

Next, in step S526, the controller 1042 notifies the status of the transmission to the host device 102, but it is not limited thereto. In other embodiment, step S516 can be removed. In another embodiment, steps S518~S526 can also be removed. Namely, the controller 1042 ignores the received firmware data sector while determining that the mode parameter is the second mode parameter and returns to step S500 to continue processing the next firmware data sector.

Figure 6A:
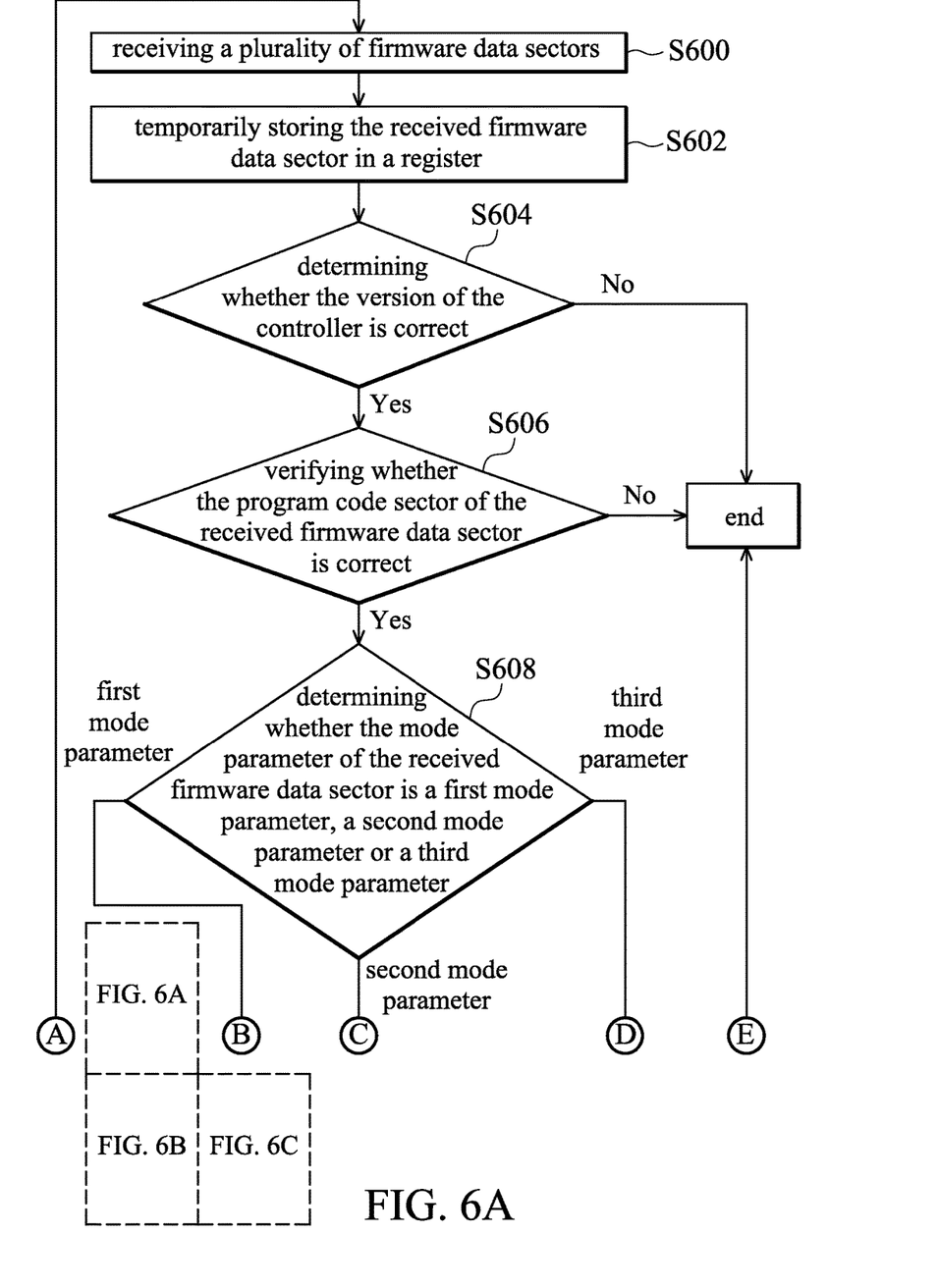
FIG. 6A~6C are flowcharts of a firmware update method according to another embodiment of the present disclosure.
Figure 6B:
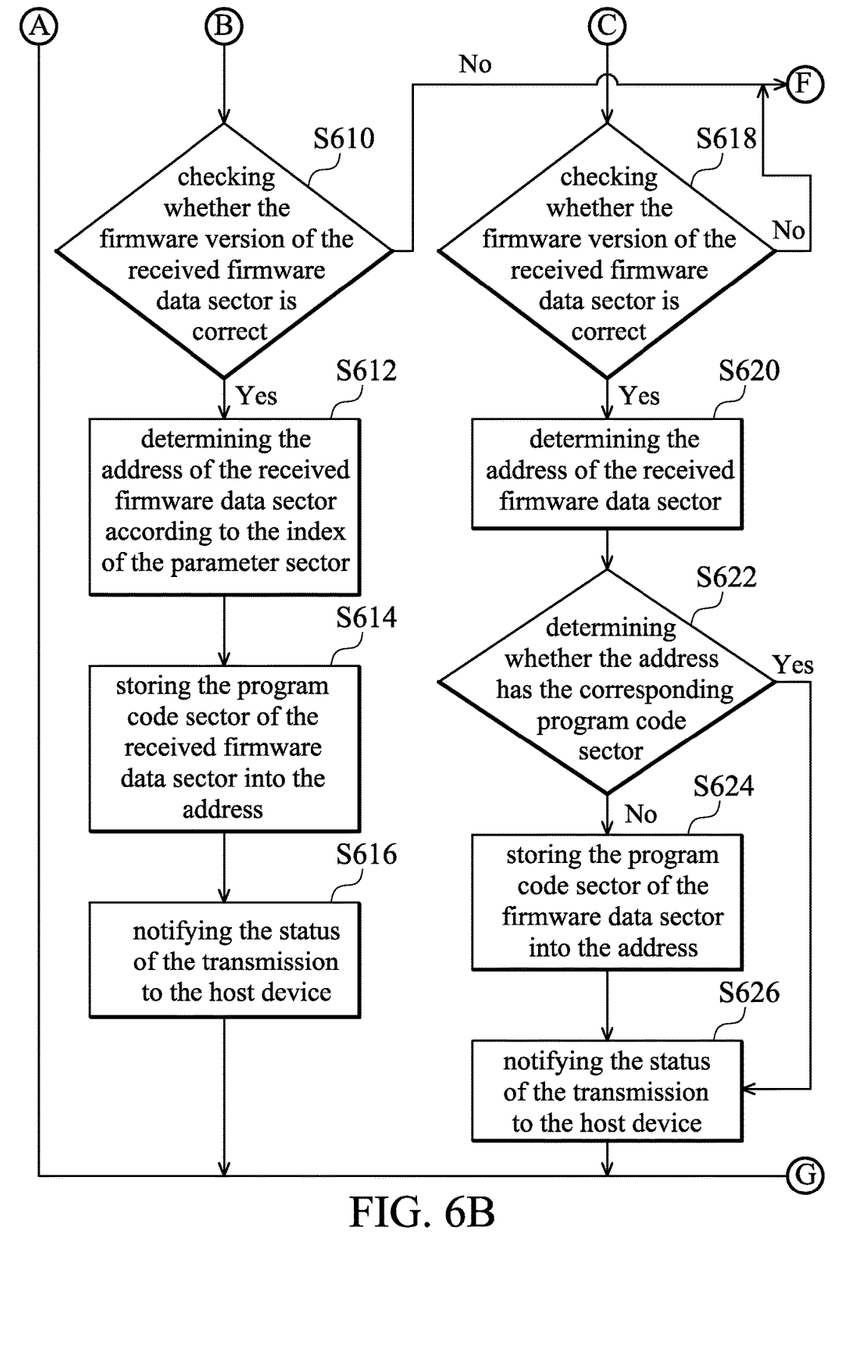
Figure 6C:
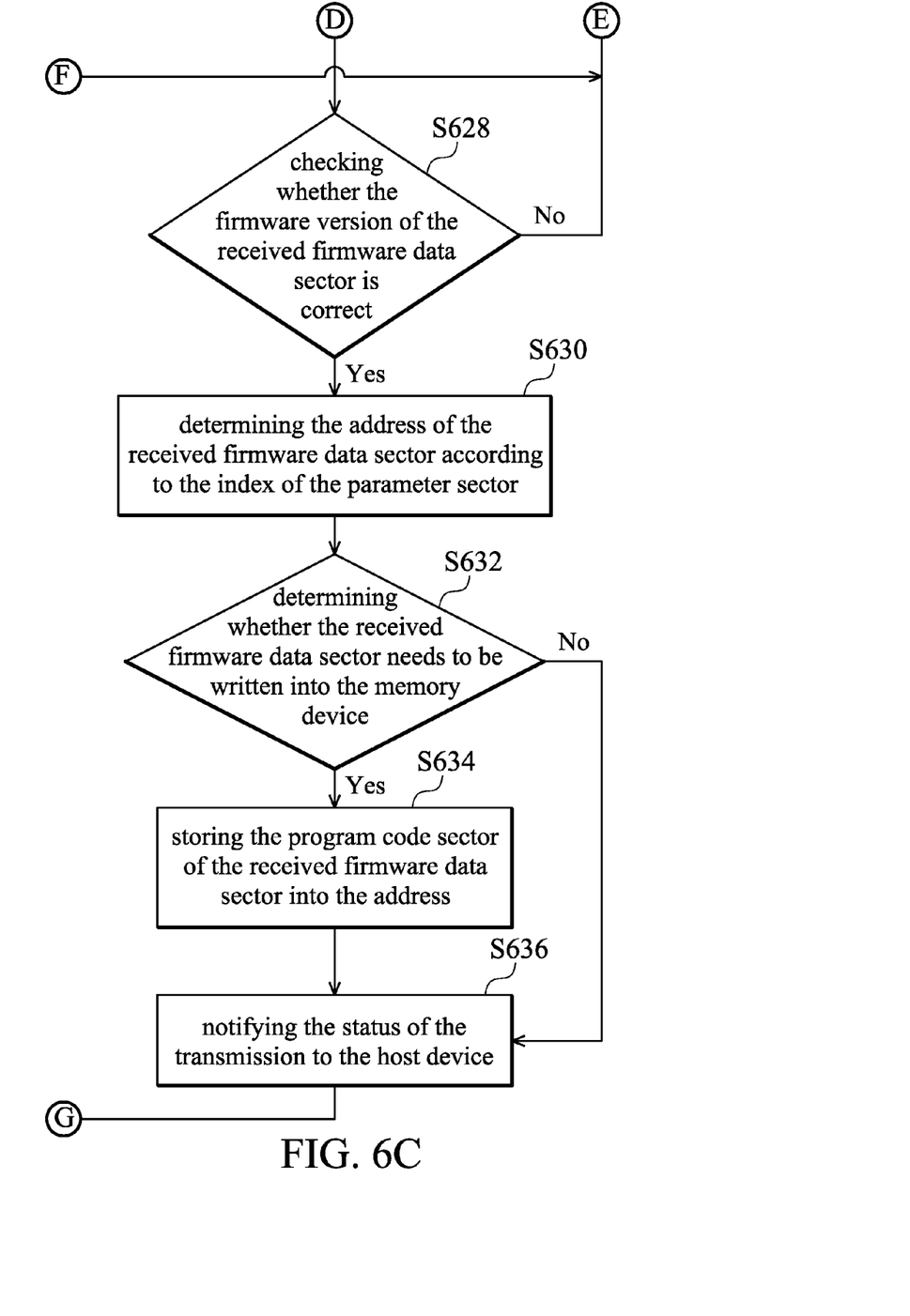

FIG. 6A~6C are flowcharts of a firmware update method according to another embodiment of the present disclosure. The firmware update method is applied to the electronic device 100 of FIG. 1, and arranged to update the firmware of the peripheral device 104 according to an update command. In this embodiment, the mode parameter further includes a third mode parameter. The process starts at step S600. It should be noted that steps S600~S606 and S610~S626 are similar to steps S500~S506 and S510~S526, steps S600~S606 and S610~S626 can be referred to in FIG. 5.

In step S608, the controller 1042 reads the mode parameter of the parameter sector of the received firmware data sector stored in a register 1044 to determine whether the mode parameter of the received firmware data sector is a first mode parameter, a second mode parameter or a third mode parameter. When the mode parameter of the received firmware data sector is the first mode parameter, the process goes to step S610. When the mode parameter of the received firmware data sector is the second mode parameter, the process goes to step S618. When the mode parameter of the received firmware data sector is the third mode parameter, the process goes to step S628.

In step S628, the controller 1042 reads the firmware version parameter of the parameter sector of the received firmware data sector stored in a register 1044 to check whether the firmware version of the received firmware data sector is correct according to the firmware version parameter of the parameter sector. When the firmware version is correct, the process goes to step S630, otherwise, the process ends at step S528, the controller 1042 stop updating the peripheral device 104.

In step S630, the controller 1042 reads the index and the data amount parameter of the parameter sector of the received firmware data sector stored in a register 1044 to determine the address of the received firmware data sector, wherein the controller 1042 obtains the length of the firmware FW according to the data amount parameter, and determine the address of the received firmware data sector according to the index of the parameter sector.

In step S632, the controller 1042 determines whether the received firmware data sector needs to be written into the memory device 1046. When the controller 1042 determines that the received firmware data sector needs to be written into the memory device 1046, the process goes to step S634, otherwise, the process goes to step S636. For example, the controller 1042 can determine whether the received firmware data sector needs to be written into the memory device 1046 according to the operation status or the status of data writing.

In step S634, the controller 1042 stores the program code sector of the received firmware data sector into the address obtained in step S530 of the memory device 1046.

Next, in step S636, the controller 1042 notifies the status of the transmission to the host device 102, but it is not limited thereto. In other embodiment, step S636 can be removed.

The electronic device 100 and the firmware update method of the present invention can continue to update the firmware after an interruption event. In another embodiment, the electronic device 100 and the firmware update method of the present invention can also determine the received firmware data sector's number in the predetermined transmission sequence, such that the firmware can be successfully updated when the transmission is not in order.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A firmware update method, applied to a host device and a peripheral device, wherein the peripheral device comprises a memory device and a controller, the firmware update method comprising:
   transmitting a first firmware data sector to a peripheral device from the host device, wherein the first firmware data sector has a first mode parameter and a first program code sector, wherein the first mode parameter represents that the first program code sector has not been written into the memory device;
   retransmitting the first firmware data sector having a second mode parameter to the peripheral device from the host device after an interruption event has occurred on the memory device during the transmission, wherein the second mode parameter represents that the first program code sector has been written into the memory device;

replacing, by the host device, the first mode parameter of the first firmware data sector with the second mode parameter of the first firmware data sector if the interruption event has occurred;

reading at least one parameter sector of the received first firmware data sector by the controller, wherein the parameter sector of the first firmware data sector comprises one of the first mode parameter and the second mode parameter;

storing to the memory device the first program code sector of the first firmware data sector having the first mode parameter; and not storing the first program code sector of the first firmware data sector having the second first mode parameter.

2. The firmware update method as claimed in claim 1, wherein the first firmware data sector is one of a plurality of firmware data sectors, each of the firmware data sectors has a program code sector and a parameter sector, and the program code sector of the firmware data sectors is arranged to constitute firmware.

3. The firmware update method as claimed in claim 2, wherein each of the parameter sectors of the first and second firmware data sector comprises a firmware version parameter, a mode parameter, an index, a controller version parameter, a data amount parameter, and a check parameter.

4. A firmware update method, applied to a host device and a peripheral device, wherein the peripheral device comprises a memory device and a controller, the firmware update method comprising:

sequentially transmitting a plurality of firmware data sectors to the peripheral device from the host device, wherein N firmware data sectors constitute firmware, and each of the firmware data sectors comprises a first mode parameter and a program code sector, wherein the first mode parameter represents that the corresponding program code sector has not been written into the memory device;

replacing, by the host device, the first mode parameter of the firmware data sector with a second mode parameter after transmission of the first firmware data sector is interrupted;

retransmitting the firmware data sectors from 1 to N to the peripheral device after the transmission of the firmware data sectors of the firmware is interrupted at the Xth firmware data sector, wherein N is greater than X, each of the first to (X−1)th firmware data sectors retransmitted comprises the second mode parameter, wherein the second mode parameter represents the corresponding program code sector has been written into the memory device, and each of the Xth to Nth firmware data sectors retransmitted comprises the first mode parameter;

reading at least one parameter sector of the received firmware data sector by the controller, wherein the parameter sector of the firmware data sector comprises one of the first mode parameter and the second mode parameter;

storing to the memory device the corresponding program code sectors of the each of the plurality of firmware data sectors having the first mode parameter; and not storing the corresponding program code sectors of the each of the plurality of firmware data sectors having the second first mode parameters.

5. An electronic device capable of updating firmware, comprising:

a memory device; and a controller, configured to receive a plurality of firmware data sectors from a host device in a sequence, read at least one parameter sector of the received firmware data sector, store a program code sector of the received firmware data sector into the memory device when the parameter sector of the received firmware data sector comprises a first mode parameter, wherein the first mode parameter represents that the program code sector has not been written into the memory device, and not store the program code sector of the received firmware data sector when the parameter sector of the received firmware data sector comprises a second mode parameter, wherein the second mode parameter represents the program code sector has been written into the memory device, wherein the firmware data sectors constitute firmware, and wherein the host device is capable of replacing the first mode parameter of the parameter sector of the received firmware data sector with the second mode parameter if an interruption event occurs, and the host device retransmits the plurality of firmware data sectors to the controller if the interruption event occurs.

6. The electronic device capable of updating firmware as claimed in claim 5, wherein the firmware is constituted by the program code sectors of the firmware data sectors.

7. The electronic device capable of updating firmware as claimed in claim 5, wherein the controller reads the parameter sector of the received firmware data sector to determine what number in the sequence the received firmware data sector is according to an index of the read parameter sector, and stores the program code sector of the received firmware data sector into a corresponding address of the memory device according to the numbers of the firmware data sectors in the sequence.

8. The electronic device capable of updating firmware as claimed in claim 5, wherein the controller reads the parameter sector of the received firmware data sector to determine a data length of the firmware according to a data amount parameter of the read parameter sector and determine whether all of the firmware data sectors have been received according to the data amount parameter and the index.

9. The electronic device capable of updating firmware as claimed in claim 5, wherein the controller reads the parameter sector of the received firmware data sector to determine whether the program code sector of the received firmware data sector needs to be stored into the memory device according to a third mode parameter of the read parameter sector of the received firmware data sector.

10. The electronic device capable of updating firmware as claimed in claim 5, wherein the controller reads the parameter sector of the received firmware data sector to check whether the version of the controller is correct according to a controller version parameter of the read parameter sector, verifies the program code sector of the received firmware data sector according to a verification parameter of the read parameter sector, and checks whether the version of the firmware is correct according to a firmware version parameter of the read parameter sector.

11. The electronic device capable of updating firmware as claimed in claim 5, wherein the program code sectors of N firmware data sectors constitute the firmware, and the host device replaces each of the first mode parameters of the first to (X−1)th of the firmware data sectors with the second mode parameter after the transmission of the firmware data sectors of the firmware is interrupted at the Xth firmware data sector, wherein N is greater than X.

* * * * *

UNITED STATES PATENT AND TRADEMARK OFFICE
CERTIFICATE OF CORRECTION

PATENT NO. : 9,766,880 B2
APPLICATION NO. : 14/711513
DATED : September 19, 2017
INVENTOR(S) : Chun-Yi Lo Page 1 of 1

It is certified that error appears in the above-identified patent and that said Letters Patent is hereby corrected as shown below:

Column 11, Lines 20-21, the portion of the claim reading "-having the second first mode parameter-" should read -having the second mode parameter- Signed and Sealed this
Twelfth Day of December, 2017

Joseph Matal
*Performing the Functions and Duties of the*
*Under Secretary of Commerce for Intellectual Property and*
*Director of the United States Patent and Trademark Office*